US 6,651,798 B2

(12) United States Patent
Newnes et al.

(10) Patent No.: US 6,651,798 B2
(45) Date of Patent: Nov. 25, 2003

(54) METHOD AND APPARATUS FOR REPOSITIONING OF WORKPIECES ON A LUGGED TRANSFER CHAIN (75) Inventors: William R. Newnes, Salmon Arm (CA); Deane R. Hendersen, Salmon Arm (CA)

(73) Assignee: Coe Newnes/McGehee ULC, St. Laurent (CA)

(*) Notice: Subject to any disclaimer, the term of this patent is extended or adjusted under 35 U.S.C. 154(b) by 48 days.

(21) Appl. No.: 10/073,111

(22) Filed: Feb. 12, 2002

(65) Prior Publication Data

US 2002/0117377 A1 Aug. 29, 2002

Related U.S. Application Data (60) Provisional application No. 60/267,743, filed on Feb. 12, 2001.

(51) Int. Cl.$^7$ ................................................ B65G 25/00
(52) U.S. Cl. ............... 198/341.05; 198/456; 198/468.1; 198/468.2; 144/424; 144/248.2
(58) Field of Search ......................... 198/456, 468.2, 198/468.1, 597, 341.05; 414/14, 17, 746.7; 144/424, 248.2, 248.4, 250.19, 250.2

(56) References Cited

U.S. PATENT DOCUMENTS

| 1,789,570 | A | | 1/1931 | Teetor |
| 2,657,784 | A | | 11/1953 | Stoker |
| 2,778,474 | A | * | 1/1957 | Koning .................. 198/456 |
| 2,918,951 | A | * | 12/1959 | Haumann .................. 198/456 |
| 3,720,300 | A | * | 3/1973 | Rysti .................... 198/456 |
| 4,031,790 | A | | 6/1977 | Arvidsson |
| 4,164,248 | A | | 8/1979 | Rysti |
| 4,386,641 | A | | 6/1983 | Horn |
| 4,413,662 | A | | 11/1983 | Gregoire et al. |
| 4,753,335 | A | | 6/1988 | Goater |
| 4,960,023 | A | | 10/1990 | Reuter et al. |
| 5,142,955 | A | | 9/1992 | Hale |
| 5,390,778 | A | | 2/1995 | Ritola |
| 5,419,425 | A | | 5/1995 | Goater |
| 5,429,161 | A | | 7/1995 | Allard |
| 5,911,302 | A | | 6/1999 | Jackson |
| 6,173,829 | B1 | | 1/2001 | Jackson et al. |
| 6,244,420 | B1 | * | 6/2001 | Pelletier ................ 198/456 |

FOREIGN PATENT DOCUMENTS

CA 2276119 12/2000

* cited by examiner

Primary Examiner—Joseph E. Valenza
(74) Attorney, Agent, or Firm—Antony C Edwards (57) ABSTRACT An apparatus for repositioning a workpiece on a lugged conveyor, where the conveyor has lugs for carrying the workpiece spaced apart by a lug space in a downstream direction. The apparatus includes a sensor for detecting the position of the workpiece on the conveyor and relaying position information to a processor, at least one running element mountable in cooperation with the conveyor, a selectively actuable actuator cooperating with the processor for the selective actuation of the running element.

36 Claims, 10 Drawing Sheets

METHOD AND APPARATUS FOR REPOSITIONING OF WORKPIECES ON A LUGGED TRANSFER CHAIN

CROSS REFERENCE TO RELATED APPLICATION

This application claims priority from U.S. Provisional Patent Application No. 60/267,743 filed Feb. 12, 2001 entitled Fenceless Fence.

FIELD OF THE INVENTION

This invention relates to a device for frictionally engaging an end of a workpiece such as a board on a moving lugged chain conveyor and laterally translating the workpiece perpendicularly relative to the direction of travel so as to accurately reposition the workpiece in relation to downstream work centres such as trimming saws, without impeding the downstream travel rate of the workpiece.

BACKGROUND OF THE INVENTION

Lumber within a mill is generally transported by transfer chains having upstanding lugs or like means for engaging and moving lumber workpieces. Such transfer chains can now commonly travel at a rate of, for example, up to 200 lugs per minute.

As taught in the prior art, as a board is transported toward a trimmer gang saw for example, sensors determine the position of the a board in relation to the position of the saws in the gang saw. The final positioning of the board for accurate trimming is attempted by, in one method, actively positioning a fence against which the board has been ended. At high transfer rates it is undesirable to have to end the board against a fence because inaccuracy is introduced, for example, because of bounce-back of the board to name just one disadvantage. Inaccuracy is the result of having to reposition the board across the moving chains in the time interval allowed by the lug spacing along the chains.

It is one object of this invention to provide a workpiece repositioning device that may quickly and more accurately reposition a lumber workpiece in relation to a downstream workstation or machine or work centre such as a trimmer, without impeding the rate of travel of the workpieces, and so as to allow the longitudinal translation of the workpiece along its length while the workpiece is firmly in contact with the lugged transfer chain.

SUMMARY OF THE INVENTION

In summary, the present invention is an apparatus for repositioning a workpiece on a lugged conveyor, where the conveyor has lugs for carrying the workpiece spaced apart by a lug space in a downstream direction. The apparatus includes a sensor for detecting the position of the workpiece on the conveyor and relaying position information to a processor, at least one running element mountable or mounted in cooperation with the conveyor, a selectively actuable actuator cooperating with the processor for the selective actuation of the running element.

The running element may be disposed on one side of a workpiece flow path on the conveyor. The running element frictionally engages a workpiece as the workpiece translates downstream in a first direction along the flow path on the conveyor. On the conveyor the workpiece is oriented so that its longitudinal axis is substantially perpendicular to the first direction. The running element is mounted so that it does not move in the first direction. The running element is selectively actuable so as to selectively translate the workpiece, when in frictional engagement therewith, in a second direction substantially perpendicular to the first direction.

The running element in actuated in the second direction by the actuator so as to urge the workpiece in lateral translation across the flow path and perpendicular to the first direction according to repositioning instructions from the processor in response to the position information from the sensor as the workpiece simultaneously translates in the first direction downstream along the flow path across the running element while frictionally engaged by the running element.

The running element has a length in the first direction which does not exceed the length of the lug space of the lugs on the lugged conveyor.

In one embodiment, the running element is at least one ending roll, which may be a first array of ending rolls extending in the second direction across the flow path. The at least one ending roll may include a plurality of ending rolls spaced apart in a downstream array from a first upstream ending roll, each ending roll of the plurality of ending rolls independently actuable for increasingly accurate repositioning of the workpiece as the workpiece is translated downstream into sequential frictional engagement with successive downstream ending rolls of the plurality of ending rolls. The at least one ending roll may also include a plurality of arrays of ending rolls wherein each array of ending rolls in the plurality of arrays of ending rolls is an array of ending rolls extending in the second direction across the flow path, and wherein the plurality of arrays of ending rolls are spaced apart in a downstream array from a first upstream array of ending rolls. In this embodiment each array of ending rolls of the downstream array is independently actuable for increasingly accurate repositioning of the workpiece as the workpiece is translated downstream into sequential frictional engagement with successive downstream arrays of ending rolls of the downstream array.

In a further embodiment the at least one running element includes a pair of running elements disposed oppositely on upper and lower sides of the workpiece flow path, the pair of running elements vertically spaced apart for pinching the workpiece between the pair of running elements. The pair of running elements may be a pair of rollers. The pair of running elements may include at least one hold-down roll on the upper side of the flow path and at least one ending roll on the lower side of the flow path. The at least one hold-down roll urges the workpiece down onto the at least one ending roll. Again, the at least one ending roll may be a first array of ending rolls extending in the second direction across the flow path, and may include a plurality of ending rolls or arrays of ending rolls spaced apart in a first downstream array from the first upstream ending roll or first array of ending rolls. The at least one hold-down roll may include a plurality of hold-down rolls spaced apart in a second downstream array corresponding to the first downstream array.

The apparatus of the present invention may include a frame having upper and lower arms for extending across the flow path. The pair of running elements may be a pair of upper and lower arrays of wheels oriented in the first direction, where the arrays of wheels are mounted respectively to the upper and lower arms of the frame. The actuator selectively translates the frame in the second direction so as to actuate the pair of running elements in the second direction whereby the workpiece is pushed or pulled in the second direction by the pair of running elements. The frame may be a "C"-shaped frame. The upper and lower arms may extend in the second direction respectively above and below the flow path, a vertical arm joining the upper arm to the lower arm adjacent a side edge of the conveyor.

In a further embodiment, the pair of running elements may be a pair of upper and lower endless belts or chains oriented in the first direction, the endless belts or chains mounted respectively to the upper and lower arms of the frame. Again, the actuator selectively translates the frame in the second direction so as to actuate the pair of running elements in the second direction whereby the workpiece is pushed or pulled in the second direction by the pair of running elements.

The pair of running elements may include a plurality of pairs of running elements spaced apart in a downstream array from a first upstream pair of running elements. Again, each pair of running elements of the downstream array are independently actuable in the second direction for increasingly accurate repositioning of the workpiece as the workpiece is translated downstream into sequential frictional engagement with successive downstream pairs of running elements. Thus for example the pair of upper and lower arrays of wheels may include a plurality of the pairs of upper and lower arrays of wheels spaced apart in a downstream array from a first upstream pair of upper and lower arrays of wheels.

BRIEF DESCRIPTION OF THE DRAWINGS

FIG. 1b is a partially cut-away sectional view along line 1b—1b in FIG. 1a.

DETAILED DESCRIPTION OF EMBODIMENTS OF THE INVENTION

Figure 1:
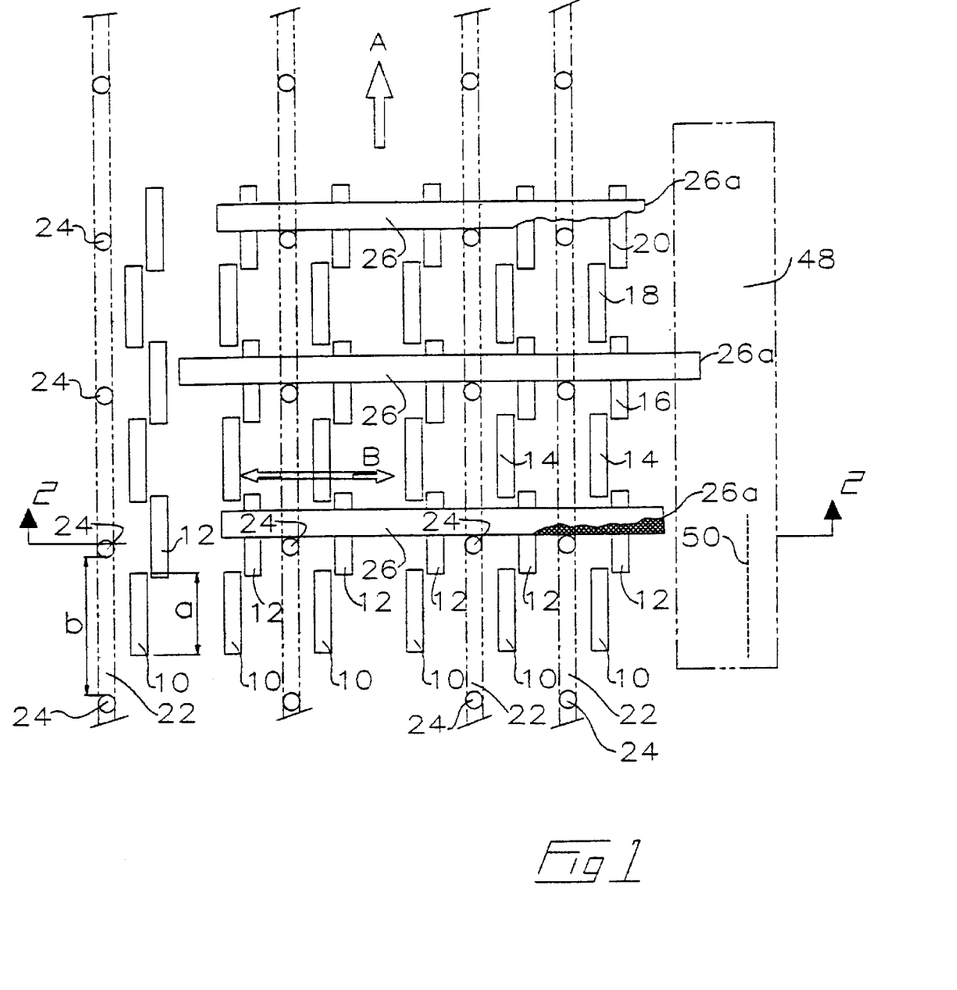
FIG. 1 is, in plan view, an ending apparatus in one embodiment of the workpiece repositioning device of the present invention.

As seen in FIG. 1, laterally spaced apart arrays of ending rolls 10, 12, 14, 16, 18 and 20 are mounted laterally across longitudinally extending chain runs 22. Chain runs 22 may be conventional, having chain lugs 24 mounted thereon in equally spaced apart longitudinal arrays. Each laterally extending row or array of ending rolls is oriented generally perpendicular to chain runs 22 and thus perpendicular to the direction of flow A of workpieces 26 carried in chain lugs 24.

At least one row of the ending rolls, as better described below, differ from conventional ending rolls in that each of the ending rolls in the row is shorter than the lug spacing between chain lugs 24 on chain runs 22. Thus, as illustrated in FIG. 1 by way of example, longitudinal dimension a of ending rolls 10 is shorter than the longitudinal dimension b between chain lugs 24.

Figure 1A:
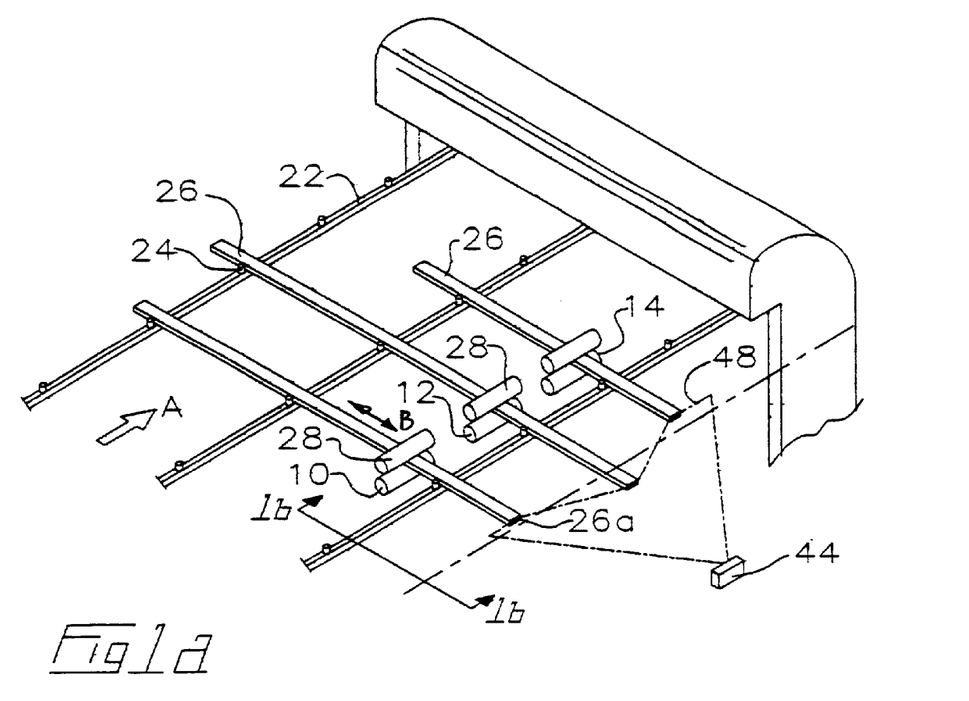
FIG. 1a is, in perspective view, an alternative embodiment of the present invention.
Figure 1B:
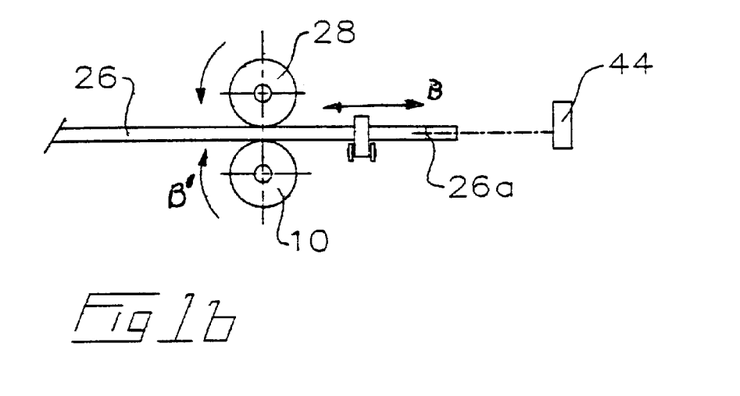
Figure 2:
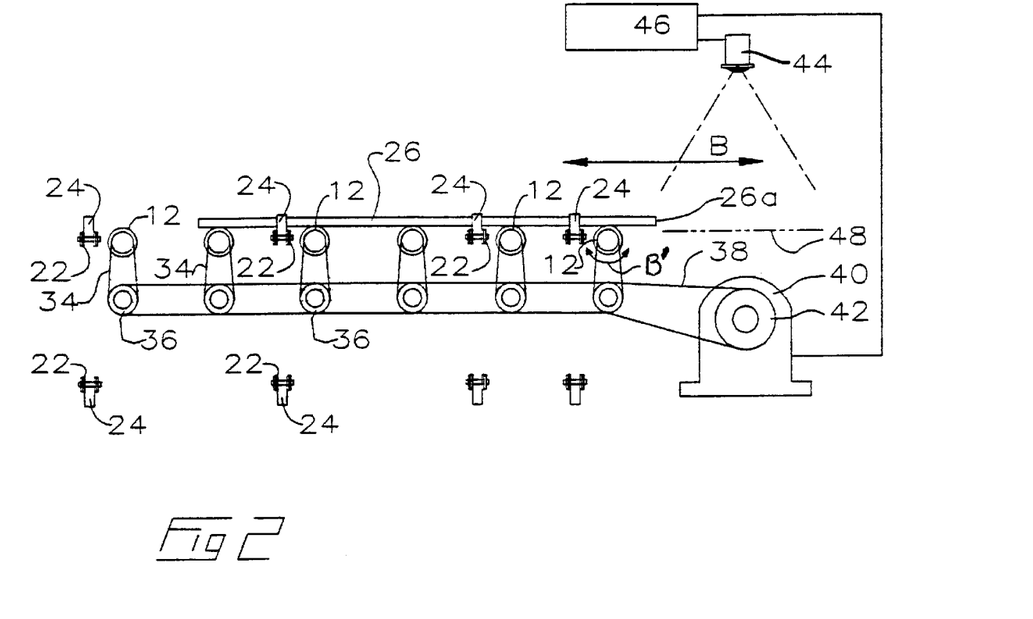
FIG. 2 is a cross-sectional view along line 2—2 in FIG. 1.
Figure 3:
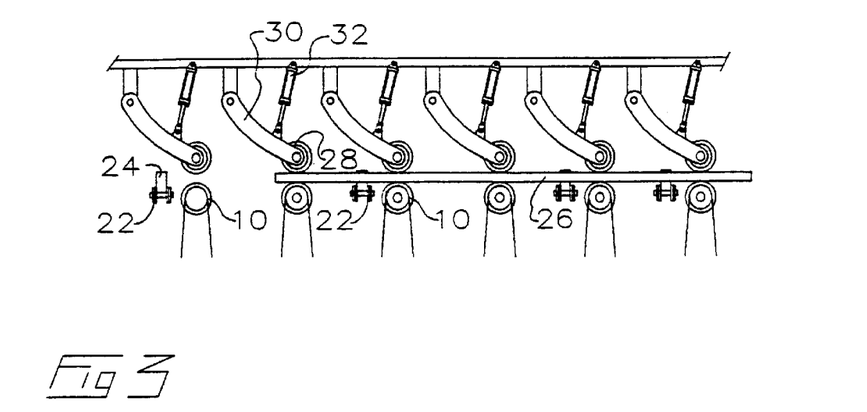
FIG. 3 is, in end elevation view similar to that of FIG. 2, an alternative embodiment of the present invention.
Figure 3A:
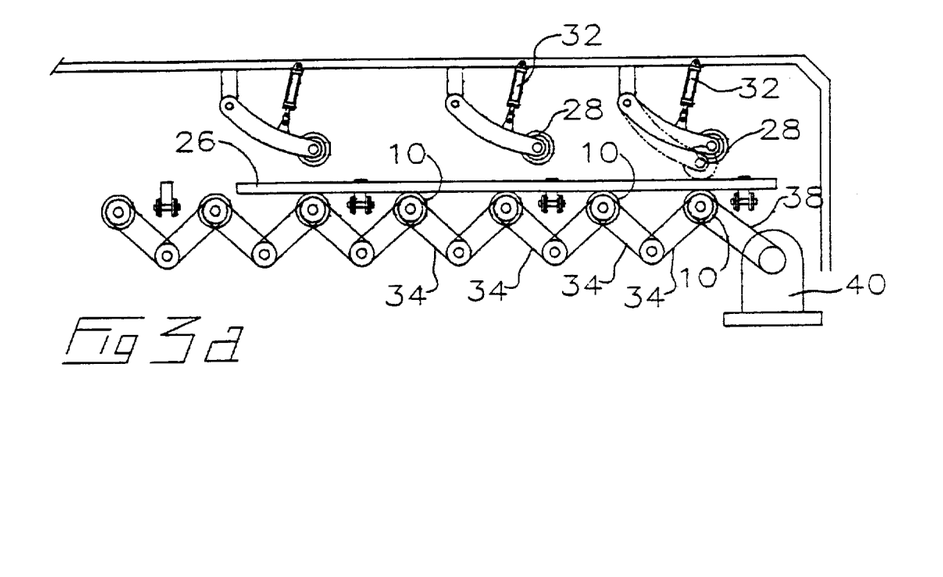
FIG. 3a is an alternative embodiment of the view of FIG. 3.
Figure 4:
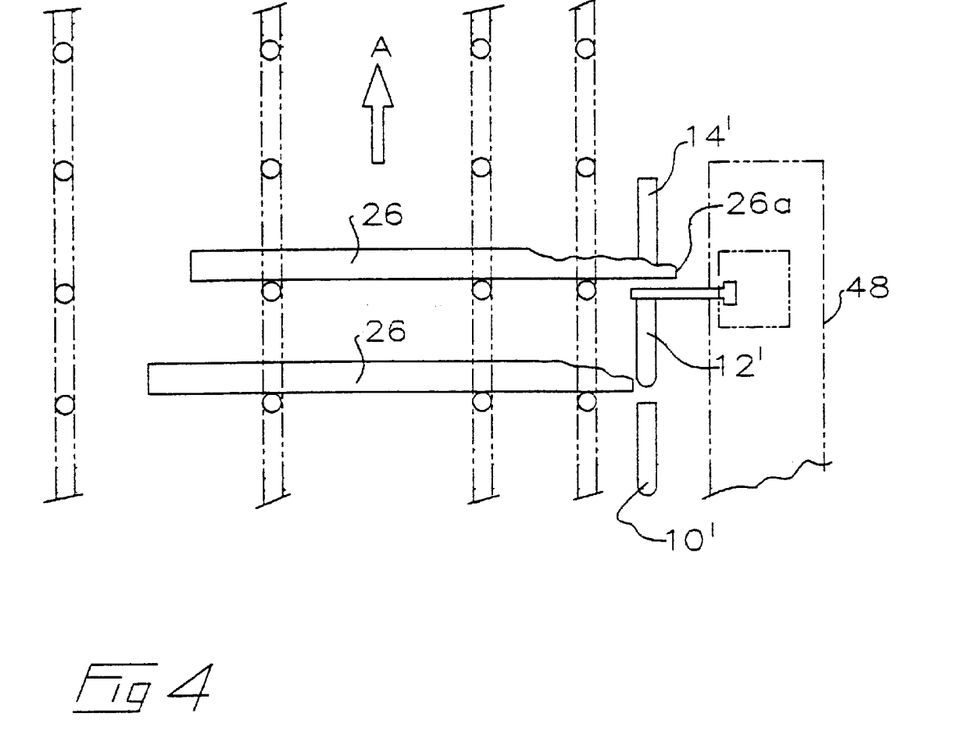
FIG. 4 is, in plan view, an alternative embodiment of the present invention.

In the conventional manner, as workpieces 26 are translated in direction A on chain lugs 24, the lower-most surfaces of workpieces 26 are slid over, so as to frictionally engage, the uppermost surfaces of the ending rolls, for example, the upper surfaces of ending rolls 12 as seen in FIG. 2. As seen in FIGS. 1a, 1b, 3, 3a and 5, the frictional engagement between workpiece 26 and the uppermost surfaces of the ending rolls may be enhanced by the use of hold down rolls 28. Hold down rolls 28 may be rotatably mounted on pivoting arms 30 and actuated by selective actuators 32. As seen in FIG. 4, the ending rolls may be bull-nosed to facilitate ease of entry of workpieces 26 on to the uppermost surfaces of the ending rolls as the workpieces are slid in direction A, especially if the workpieces are warped, twisted or bowed or otherwise non-linear so that they dip downwardly into the spaces between the chain runs.

The ending rolls, such as ending rolls 12 in FIG. 2, may be chain or belt driven for example by means of drive belts 34 driven by rotation of idler shafts, rolls or sprockets as the case may be which in turn are rotatably driven by a main drive loop 38, which may be a chain or belt driven by a selectively actuable motor 40 driving drive, pulley or sprocket 42, or other drive means known in the art. The specific drive linkage arrangements illustrated are not intended to be limiting. Thus, although the ending roll drive arrangement illustrated in FIG. 2 is by way of example only, it is understood that each row of ending rolls, in the embodiments where more than one row are employed, are independently actuable, so that one row of ending rolls may be independently accelerated and decelerated independently of other ending roll rows. Each of the rows of ending rolls may be independently actuated so as to drive workpieces 26 in direction B by rotation of rollers in a corresponding direction B'.

In the prior art, where the ending rolls extended longitudinally longer than the lug spacing between adjacent chain lugs, it was typically the case that two or more workpieces would be simultaneously resting on the same ending roll or row of ending rolls. Consequently this did not allow for the use of the ending roll or row of ending rolls to independently laterally translate one workpiece independently of another adjacent workpiece. Thus in trying to accurately end the workpieces without bounce-back or breakage of the end of the workpiece being ended, which led to inaccuracy in implementing the cutting solution (which was based on the scanned image and length of the workpiece as scanned upstream), the prior art is replete with attempts to use fixed and variably positionable fences against which the ends of the workpieces are ended as the workpieces are translated longitudinally into the saw gangs. In the present invention, the use of a physical fence whether fixed or variably positionable is eliminated because the ending rolls themselves are used as active running elements to actively position the workpieces as if they were being ended against a fence. In one aspect of the present invention, this is made possible by the use of running elements, such as the ending rolls presently being discussed, which are shorter than the lug spacing so that at any one time, only a single workpiece is riding on a single ending roll or row of ending rolls.

Thus for any given chain speed, assuming for the moment that the chain speed is constant, each sequential workpiece carried over an ending roll or row of ending rolls in the chain lugs will have a constant dwell time T within which a workpiece is frictionally engaged on top of the ending roll or row of ending rolls. Again, assuming for the moment that successive downstream ending rolls or rows of ending rolls are of the same length as the length of the first ending roll or row of ending rolls so that, for example, dimension a of ending rolls 10 is the same as the corresponding length dimension of ending rolls 12, then again, given a constant chain speed, a workpiece being slid over ending rolls 12 would be in frictional engagement with ending rolls 12 also for dwell time T. If the position of the workpiece 26 is actively monitored, for example by means of a processor actively monitoring the output from a camera or scanner or other sensor means known in the art, such as the camera or scanner 44 seen in FIG. 2, then the processor 46 can provide active feedback directly or indirectly to motor 40. Motor 40 may then actively position workpiece 26 in direction B or B' according to the desired ending position of workpiece 26 established by an optimiser so as to optimise the position of workpiece 26 relative to the downstream saws. In the examples illustrated, which is not intended to be limiting, the ending position of workpieces 26 is monitored by sensing the position of workpiece ends 26a as they enter the field of view 48 shown in dotted outline of camera or scanner 44.

It will be understood that lateral translation of workpieces 26 has to be accomplished within dwell time T by accelerating workpieces 26 from a standing start, that is, from a zero lateral velocity through a lateral acceleration and velocity profile which may be sinusoidal or bell-shaped, and then back to a zero lateral velocity so as to smoothly accelerate and decelerate each workpiece. This places the corresponding end 26a of the workpiece in its optimal ending position within dwell time T. Thus a first upstream ending roll such as ending roll 10' in FIG. 4 or a first upstream row of ending rolls such as ending rolls 10 in FIG. 1, may have to laterally translate workpiece 26 a considerable distance, for example 12 inches, so as to bring end 26a to its optimum ended position within field of view 48 by the acceleration and deceleration of the ending rolls within dwell time T. Given that the chain runs may be carrying the workpieces at speeds ranging between 80 and 220 pieces per minute, which is not intended to be limiting, the workpiece being laterally translated by the first upstream ending roll or row of ending rolls consequently must be aggressively translated in order to position end 26a at its optimum ended position within dwell time T. Such aggressive lateral translation means that the upstream ending roll or row of ending rolls, such as ending roll 10' or ending rolls 10 must be rapidly accelerated to a relatively high lateral velocity and then rapidly decelerated so that end 26a can cover the required distance within dwell time T with any reasonable accuracy in placing end 26a at its optimal ended position, for example that indicated by dotted line 50. The use of an aggressive acceleration profile will, however, likely introduce inaccuracies in the positioning of end 26a on line 50 due to, for example, slippage between the upper surface of the ending rolls and the workpiece. Given the limited duration of dwell time T, there may not be, and likely will not be, opportunity to actively re-accelerate the upstream ending roll or row of ending rolls so as to more accurately position end 26a onto line 50 before the workpiece is translated on the chain runs from engagement with that upstream ending roll or row of ending rolls.

To improve the accuracy of placement of end 26a on to the optimal ended position line 50, a subsequent downstream ending roll, such as ending roll 12', or a subsequent downstream row of ending rolls such as ending rolls 12, may be provided to further fine tune the placement of end 26a accurately on to line 50. Again continuing with the assumption that ending rolls 12 and 12' are of the same length as ending rolls 10 and 10', although this is not a requirement, and that the chain speed is constant, although again this is not a requirement if the chain speed is monitored by the processor 46, then dwell time T corresponding to the length of time a workpiece 26 is frictionally engaged with ending rolls 12 or 12' is of the same duration as the length of time that same workpiece 26 was in frictional engagement on ending rolls 10 or 10'. Thus dwell time T provides the downstream ending roll or row of ending rolls with the same time window for accurate placement of end 26a on to line 50 as was available for ending of the workpiece on the upstream ending roll or row of ending rolls. Given that the upstream ending roll or row of ending rolls has more or less accurately ended end 26a on to line 50 and the position of end 26a has been actively monitored by processor 46 by means of camera or scanner 44, then a much less aggressive lateral acceleration and velocity profile only has to be applied by the downstream ending roll or row of ending rolls in order to increase the accuracy of the placement of end 26a on to optimal ended position line 50. If it is assumed by way of example that the upstream ending roll or row of ending rolls is capable of positioning end 26a within a two inch accuracy of line 50, then it may be that the accuracy can be increased to one half inch by the first downstream ending roll or row of ending rolls depending on factors such as slippage due to icing, the size and perhaps shape of the workpiece, the chain speed, the processing speed and the like.

Subsequent downstream ending rolls such as ending roll 14', or row of ending rolls 14, may be used to further improve the accuracy of placement of end 26a on optimal ended position line 50. To continue with the previous example, ending rolls 14 or 14', in that they are the third ending roll or row of ending rolls encountered by a workpiece (alternatively referred to as the second downstream ending roll or row of ending rolls) may provide ending accuracy of one tenth of an inch, and likewise cascading to further increase accuracy with each additional downstream ending roll or row of ending rolls. In this example of course, at some point the processor will determine from the information relayed to it by camera or scanner 44 that a particular workpiece is sufficiently accurately ended so that no further active ending of that workpiece is required.

Thus as may be seen, as opposed to the prior art of which applicant is aware, in the present invention a modular approach to the use of ending rolls for improved accuracy provides for staging of sequentially downstream ending rolls for improved accuracy according to the needs, budget and physical constraints of, for example, a particular saw or planar mill whether or not a new installation or a retrofit installation. The improvement in accuracy between additional stages may be thought of as a cascading effect or a mathematically progressive increase in accuracy. Due to the active feedback of the ending position of a workpiece during the dwell time of a particular workpiece on a particular ending roll or row of ending rolls, the lateral position of the workpiece may be adjusted either laterally forward or backwards depending on the time available while the workpiece remains in contact with the ending roll or rolls of that particular row. Whereas in the prior art of which applicant is aware, ending rolls have simply been employed using a "skid" start and a "skid" stop that are not actively controlled to laterally accelerate the workpiece for example in a progressive sinusoidal or bell shaped fashion so that the position of the workpiece can only be roughly estimated, in the present invention skidding slippage is minimized by a progressive acceleration and deceleration.

Wherein prior art systems of which applicant is aware, the lateral translation of the workpiece cannot be reversed and overshoot is merely prevented by the use of a physical fence whether rigid or variably positionable, the present invention uses the active position monitoring of the workpieces in conjunction with the reversibility of the ending rolls to reverse the lateral translation of a workpiece to correct for overshoot. In addition the present invention by use of active monitoring is not reliant on the particular diameter of the ending rolls as in the prior art where the diameter of the ending rolls are relied on to estimate the amount of lateral displacement of a workpiece by monitoring the speed i.e. number of revolutions of the roll. This is advantageous in that often the diameter of the ending rolls cannot be accurately known due to pitch or ice buildup or, for example, due to roll wear. The present invention is thus by and large also independent of the type of surface employed on the ending rolls be it rubber, urethane, or Belzona, or whether smooth, knurled or splined steel. Further, in one embodiment, slippage may be minimized by the use of an actively monitored anti-slip system for example of the type sometimes referred to as ABS type systems, rather than presetting the acceleration and deceleration profiles based on board size or roll type (for example by use of a look up table).

In the present invention it is the position of the board that is being measured and in particular the end or end shape of the board which is being looked at and/or monitored for example in FIGS. 1a and 1b by use of a light curtain oriented in the plane of the boards. Thus improved handling is achieved when dealing with warped workpieces. Ending rolls may be placed between each of the chain runs, or ending rolls may merely be mounted between the first and second chain runs as an example so as to inhibit the boards spinning. That is, they won't 'helicopter' by pivoting about a single set of ending rolls. Also, in the present invention accurate positioning is not reliant on the condition of the end of the boards as in the case with many conventional fences. Because the board ending is accomplished without a fence physically contacting the ends of the boards, accurate ending by use of the present invention may be accomplished where the boards have feather ends, snipe ends, bevel ends, square ends and where the boards are bowed, twisted or crooked. The present invention may be also especially advantageous in environments such as in a planar mill where accurate ending must be accomplished on smooth boards, at high speed, in a non-marking manner where there is no second chance to repair the board once processed.

Figure 6:
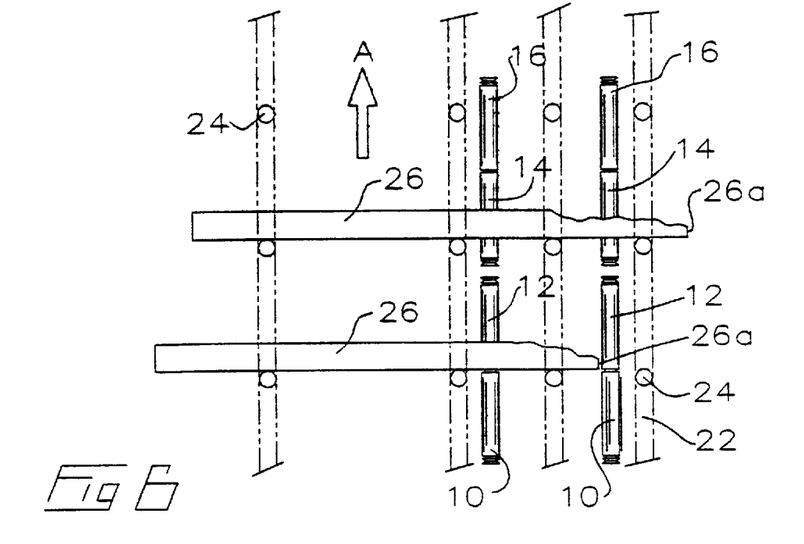
FIG. 6 is, in plan view, a further alternative embodiment of the present invention.
Figure 7:
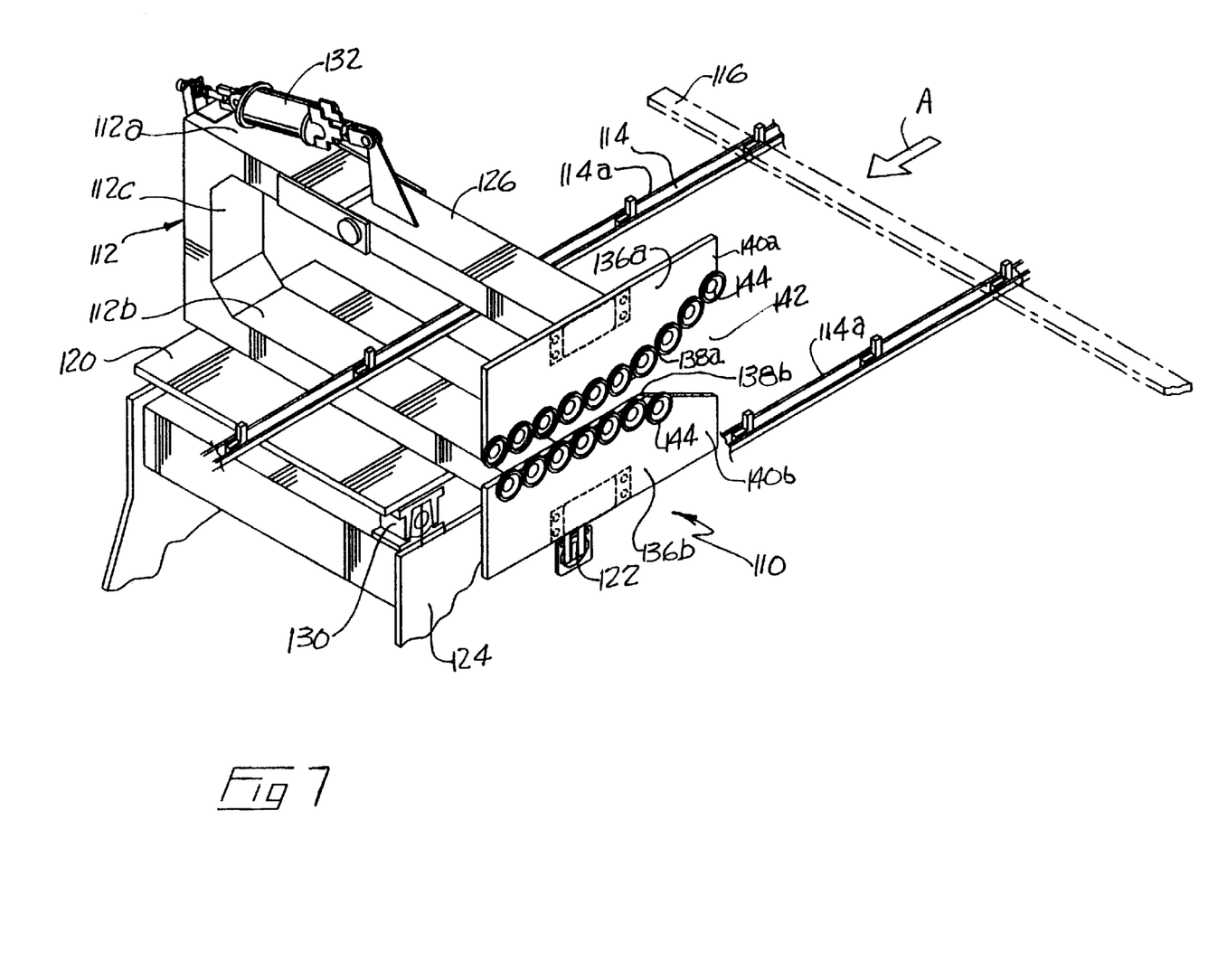
FIG. 7 is a perspective view of an alternative embodiment of the present invention.
Figure 8:
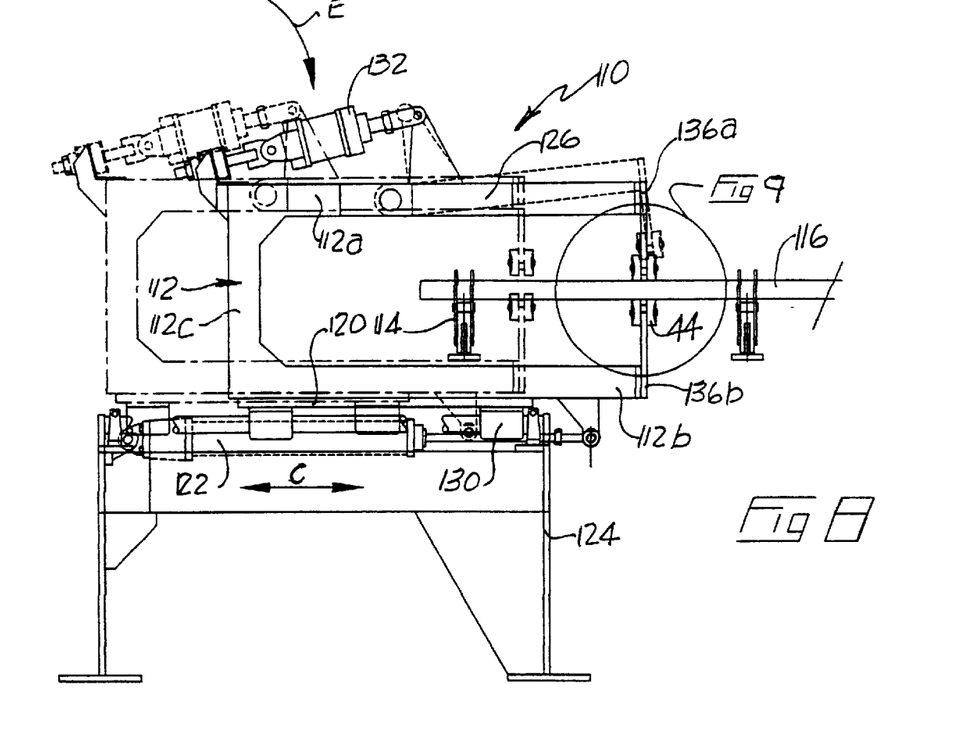
FIG. 8 is a front view of the repositioning device of FIG. 7.
Figure 9:
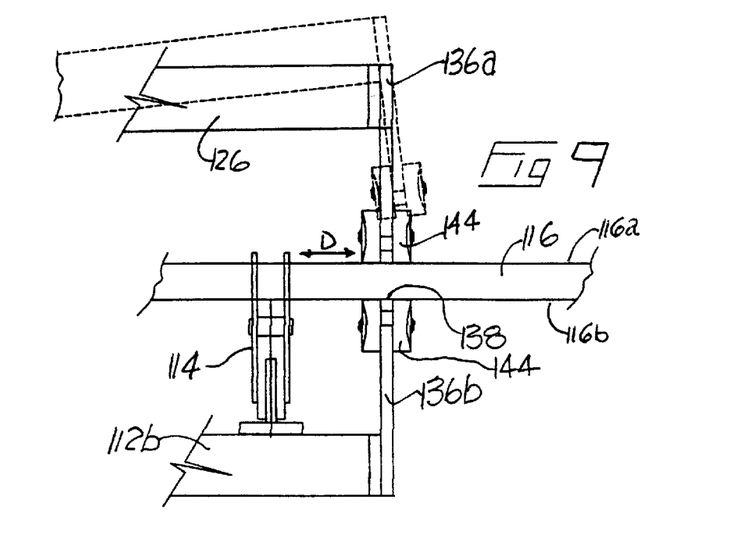
FIG. 9 is an enlarged view of a portion of FIG. 8.
Figure 10:
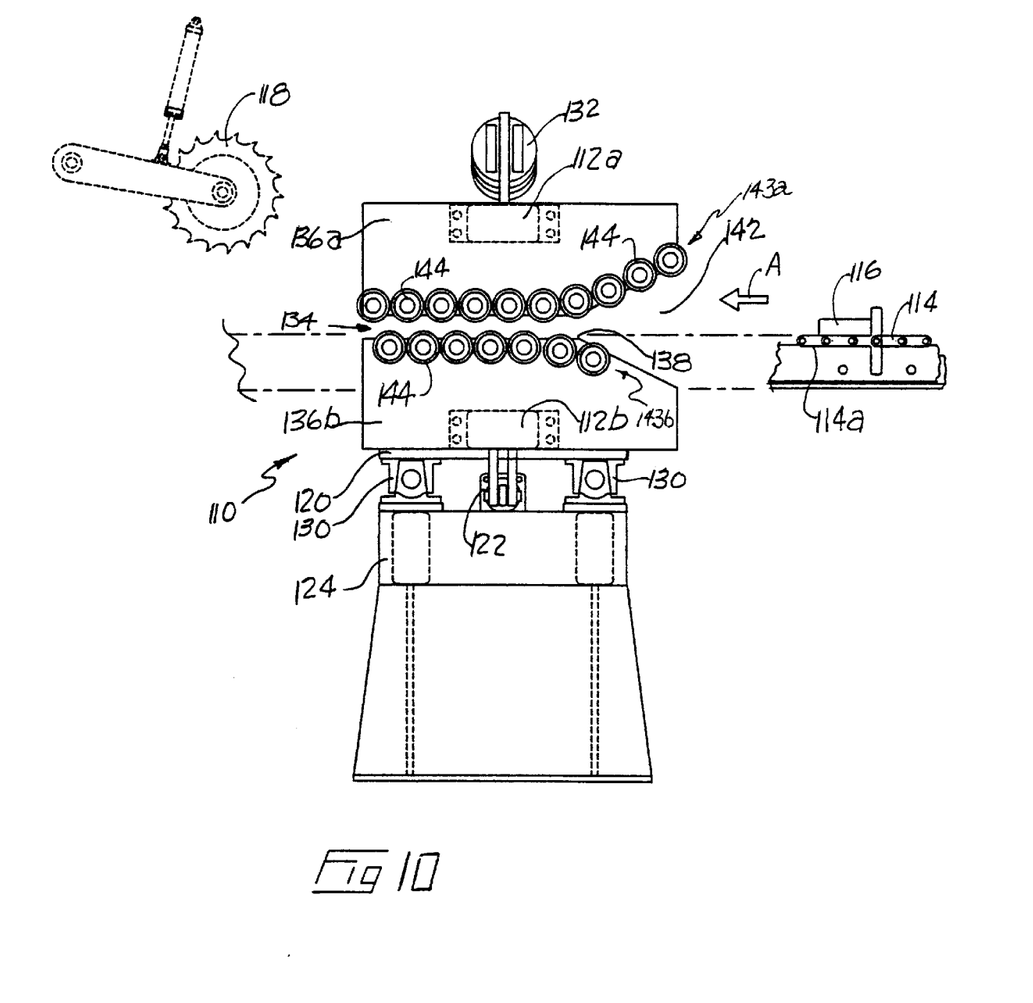
FIG. 10 is a side view of the repositioning device of FIG. 7.

As seen in FIG. 6, individual ending rolls between adjacent rows of ending rolls may be coaxially aligned. It is not intended to be limiting, wherein in FIG. 1, the ending rolls are shown arranged in a staggered and slightly overlapping manner. The staggering of the ending rolls may facilitate slight overlapping of the ends of adjacent rolls to ease transition of workpieces between adjacent rows of ending rolls, however this is not required. Thus in FIG. 6, adjacent ending rolls may be arranged so as to be closely coaxially abutting or nearly abutting and the upstream ends of individual ending rolls may be bull-nosed as mentioned in respect of FIG. 4.

Figure 5:
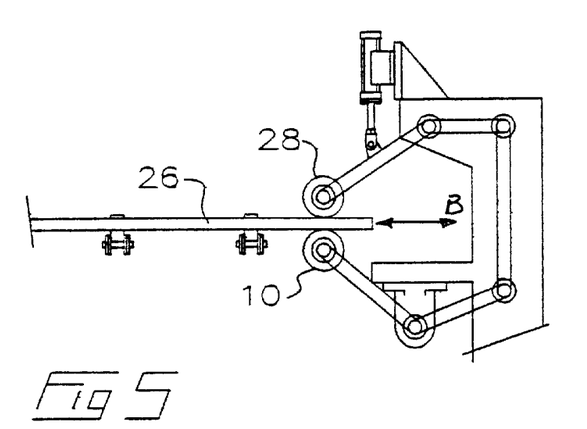
FIG. 5 is, in partially cut-away sectional view similar to that of FIG. 2, a further alternative embodiment of the present invention.

As seen in FIG. 5, in a further embodiment, the end of the workpiece may be pinched between actively driven rolls on opposite sides of the workpiece. Thus the workpiece is sandwiched between two driven rolls for positive, non-slip, lateral feeding of the workpiece during the dwell time of the workpiece as it passes by sliding between the pair of rollers in the downstream direction of travel. As with the hold down rolls of FIGS. 3 and 3a, an actuator may be provided to selectively engage the top roller with the top surface of the workpiece.

In a further alternative embodiment, as seen in FIGS. 7–10, board repositioner device 110 has a 'C'-shaped frame 112. Parallel vertically spaced apart upper and lower arms 112a and 112b are interconnected by a vertically disposed connector arm 112c. At least one lugged chain 114 of a multiple chain run passes between and generally perpendicular to the upper and lower arms to transport a workpiece such as a lumber piece 116 therethrough in downstream direction A towards a machine center or workstation such as a ganged trim saw 118. Frame 112 is mounted adjacent the chain so as to position lower arm 112b beneath chain 114 and upper arm 112a above chain 114. Frame 112 may be mounted to a support table 120, or to other support means which are movable, selectively, transversely of the chain run for example by the selective actuation one or more linear actuators 122 according to instructions from a PLC or other processor or optimizer.

Support table 120 may be mounted to an immovable mounting frame 124 through a linear motion assembly 130, which provides for support table 120 to be reciprocated in direction C, transversely of the chain run by the operation of linear actuators 122.

Upper arm 112a is aligned vertically above lower arm 112b. Arm 112a terminates generally above a medial location along lower arm 112b. A first end of an outer swing arm 126 is hinged or otherwise pivotally mounted by pivot 128 to the distal end of upper arm 112a. Swing arm 126 is pivotable about pivot 128 in a vertical plane in direction E by actuation of pneumatic cylinder 132. Cylinder 132 is mounted between upper arm 112a and outer swing arm so as to provide for selective elevation and lowering of the free end of the swing arm 126. The overall combined length of the upper arm and swing arm so match the length of lower arm 112b that the free end of the swing arm is substantially vertically aligned above the distal end of the lower arm.

Upper and lower elongate plates 136a and 136b are mounted, respectively, perpendicularly across the free end of swing arm 126 and the distal end of lower arm 112b. Plates 136a and 136b are co-planar when swing arm 126 is in its lowered position. Their lower and upper edges respectively extend from swing arm 126 and arm 112b to define a gap 134 therebetween about a horizontal medial line between upper arm 112a and lower arm 112b in the plane generally containing the chain lugs. More particularly, lower plate 136b extends upwardly from its connection to the lower arm to a position where inner longitudinal guide edge 138b on plate 136b is adjacent to and parallel with the upper surface 114a of chain 114. The upper plate 136a is, by reason of its mounting to swing arm 126, also elevated and lowered by operation of pneumatic cylinder 132 so that the inner longitudinal guide edge 138a of plate 136a may be positioned to adjust the height of gap 134 for clamping or pinching of boards having different board thicknesses.

The inner longitudinal guide edges 138a and 138b of upper and lower plates 136a and 136b are parallel. The upstream ends 140a and 140b of plates 136a and 136b form a converging entryway 142 to gap 134, which may, as illustrated by symmetrically converging into gap 134. Entryway 142 thus serves to capture and guide workpieces 116 translating downstream in direction A on the chains. Upper and lower arrays 143a and 143b of roller wheel pairs 144 are mounted respectively on and along inner guide edges 138a and 138b so as to form opposed facing staggered arrays of running elements on either side of gap 134 and entryway 142. Roller wheel pairs 144 mounted on lower plate 136b extend slightly above inner edge 138b so that a workpiece 116 transported in direction A by the chain conveyor comes into contact with the lower array of roller wheel pairs 144.

Lower plate 136b and lower arm 112b are fixed in their vertical position relative to support table 120. Outer swing arm 126 and upper plate 136a are vertically adjustable by actuation of pneumatic cylinder 132 so as to adjust the height of gap 134. Gap 134 is adjusted for the optimum spacing between the upper and lower arrays of roller wheel pairs 144 so that a workpiece is firmly pinched, grasped or clamped on its upper and lower faces 116a and 116b. This prevents slipping of the workpiece in direction D relative to wheel pairs 144 while allowing the workpiece to continue translating in direction A between the running elements, carried in its corresponding chain lugs. That is, movement of workpiece 116 in direction A forces the workpiece between and downstream through the upper and lower arrays of roller wheel pairs 144. The optimum spacing of gap 134 allows travel of an end of workpiece 116 through roller wheels 144 without impeding the rate of travel of the workpiece on the chains. The optimum spacing provides sufficient frictional engagement between the running elements and the clamped end of the workpiece so that movement of repositioner 110 through operation of the linear actuators 122 is transferred directly to the workpiece in direct correspondence.

As before with respect to arrays of ending rolls, an array of repositioners 110 may be mounted spaced apart downstream along the chain run, upstream of the machine center such as the trimmer, so that an upstream-most repositioner may clamp and translate a particular workpiece very rapidly in direction C to start a "rough-in" positioning of the workpiece towards its desired optimal position, a next adjacent downstream repositioner 110 clamping the workpiece once released from the upstream-most repositioner for a slower translation of the workpiece in direction C for a more accurate positioning of the workpiece, and so on in an increasingly accurate cascade of slower and more accurate repositioning of the workpiece into its optimized position on the chain, the cascading effect continuing all along the array of repositioners, whether there be only two repositioners in the array or many.

Figure 11:
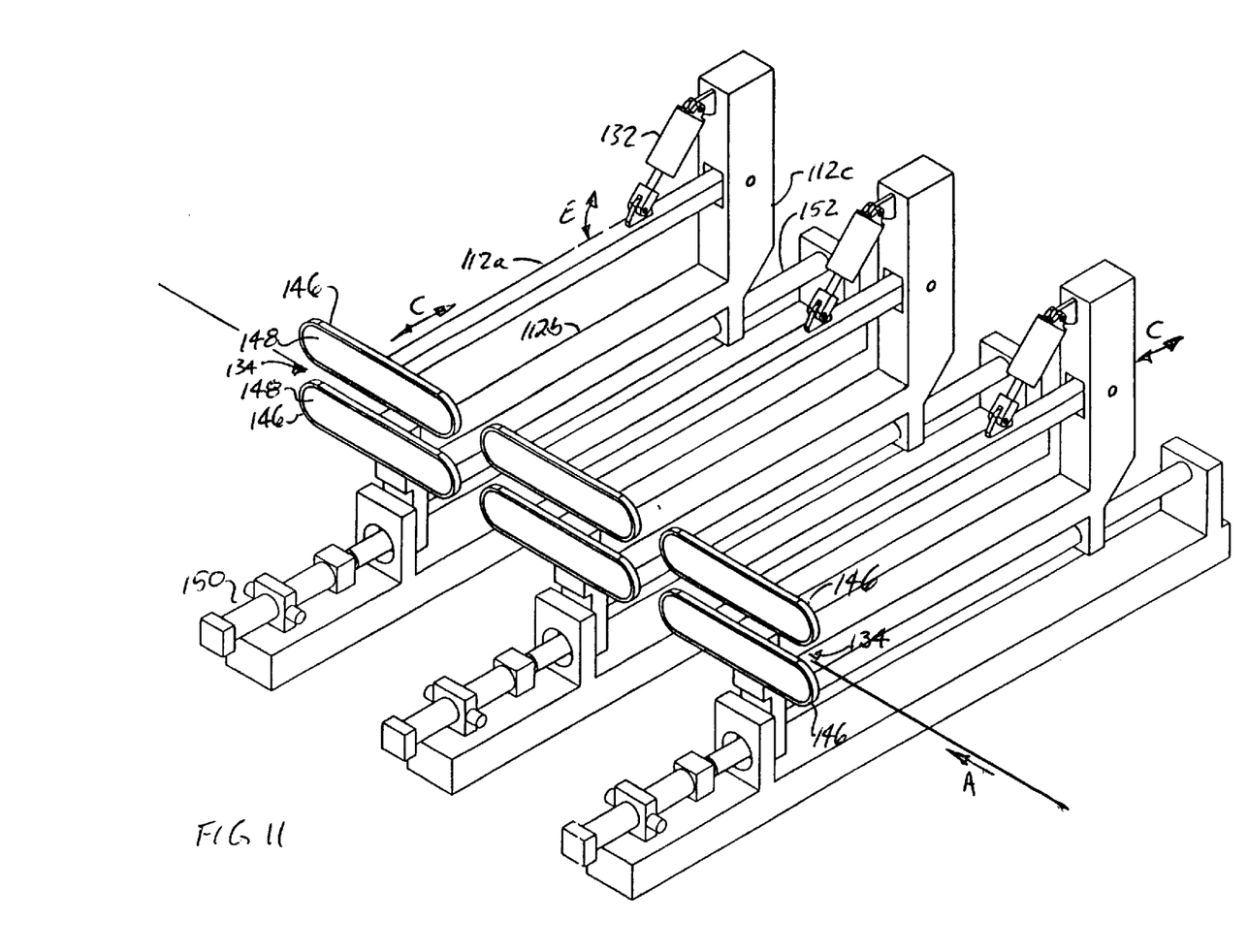
FIG. 11 is, in perspective view, an alternative embodiment of the repositioning device of FIG. 7.
Figure 12:
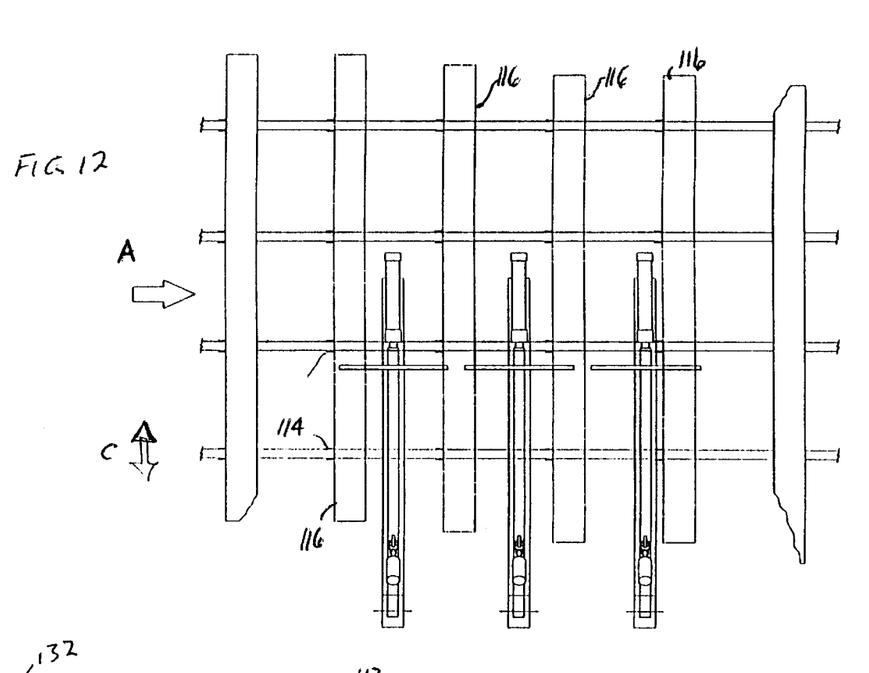
FIG. 12 is a plan view of the device of FIG. 11.
Figure 12A:
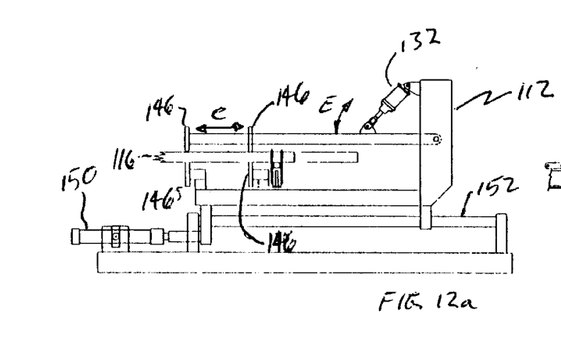
FIG. 12a is an end elevation view of the device of FIG. 12.
Figure 12B:
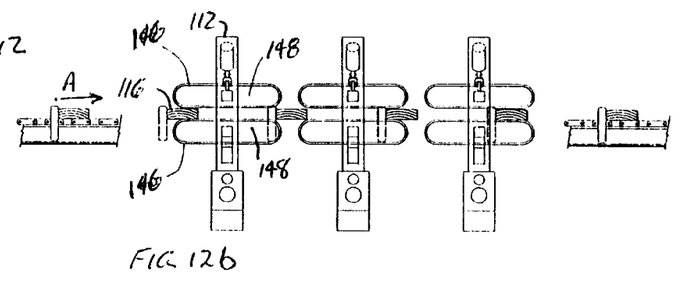
FIG. 12b is a side elevation view of the device of FIG. 12.

In the embodiment of FIGS. 11 and 12, instead of wheels 144, smooth endless chains or belts are provided. As with the use of wheels, smooth chains or belts on top and bottom allow programmable the acceleration/deceleration in direction B independent of rate of travel in direction A. The "C"-frame upper arm pivots so that the chains form a board grabber or pinchers in that they grip positively on the upper and lower surfaces of the board. When board 116 needs to be ended the chain lugs transport the board so as to be pinched between the running elements, which in this embodiment are belts or chains. The running elements do not need to be driven, although they may be, as the board will force the chains or belts around the end plates. Thus with chains or belts 146 rotatably mounted around end plates 148, as a board 116 is being transported in gap 134 between the end plates and pinched with the clamping force exerted by cylinder 132, the entire "C"-frame 112 is ended or repositioned the desired distance in direction C by cylinder or ballscrews 150 on slides 152. In this embodiment, not intended to be limiting, slides 152 are mounted 90 degrees to the flow direction A. When a board has finished being repositioned or ended plates 148 on "C"-frame 112 may be opened by cylinder 132 to clear the next board and cylinder 150 then extended or retracted to reset the frame to the home or zero position where it is ready for the next board. Alternatively, the apparatus may be used with pre-positioning or a pre-positioner so that, with the processor logic correspondingly adapted, the "C"-frame may be deliberately over-shot or under-shot relative to the zero position so that the apparatus hunts around the zero position.

If a board is not to be ended or repositioned the plates 148 may be either left in the open position or clamped. If in the clamped position, the plates stay fixed where they are and do not move in direction C. This may be an advantage in that they hold the board in the zero position. Boards may thus be accelerated and decelerated at an ideal rate to reduce slippage and mis-positioning. If the board needs to be ended or repositioned a distance greater than can be done by one repositioner then another repositioner downstream or a downstream array of such repositioners may be employed to finish the accurate positioning of the board.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for repositioning a workpiece on a lugged conveyor having lugs for carrying the workpiece spaced apart by a lug space in a downstream direction, comprising:
   a sensor for detecting the position of the workpiece on the conveyor and relaying position information to a processor,
   at least one running element mountable in cooperation with the conveyor so as to be disposed on one side of a workpiece flow path on the conveyor, said at least one running element for frictionally engaging a workpiece with said at least one running element as the workpiece translates downstream in a first direction along the flow path on the conveyor, wherein, on the conveyor, the workpiece is oriented so that its longitudinal axis is substantially perpendicular to said first direction, and wherein said at least one running element does not move in said first direction and wherein said at least one running element is selectively actuable so as to selectively translate the workpiece when in said frictional engagement therewith, in a second direction substantially perpendicular to said first direction,
   a selectively actuable actuator cooperating with the processor for said selective actuation of said at least one running element in said second direction so as to urge the workpiece in lateral translation across the flow path and perpendicular to said first direction according to repositioning instructions from the processor in response to the position information from said sensor as the workpiece simultaneously translates in said first direction downstream along the flow path across said at least one running element while frictionally engaged by said running element,
   wherein said at least one running element has a length in said first direction which does not exceed the length of the lug space of the lugs on the lugged conveyor.

2. The apparatus of claim 1 wherein said at least one running element is at least one ending roll.

3. The apparatus of claim 2 wherein said at least one ending roll is a first array of ending rolls extending in said second direction across said flow path.

4. The apparatus of claim 2 wherein said at least one ending roll includes a plurality of ending rolls spaced apart in a downstream array from a first upstream ending roll, each ending roll of said plurality of ending rolls independently actuable for increasingly accurate repositioning of the workpiece as the workpiece is translated downstream into sequential frictional engagement with successive downstream ending rolls of said plurality of ending rolls.

5. The apparatus of claim 2 wherein said at least one ending roll includes a plurality of arrays of ending rolls wherein each array of ending rolls in said plurality of arrays of ending rolls is an array of ending rolls extending in said second direction across said flow path, and wherein said plurality of arrays of ending rolls are spaced apart in a downstream array from a first upstream array of ending rolls, each said array of ending rolls of said downstream array independently actuable for increasingly accurate repositioning of the workpiece as the workpiece is translated downstream into sequential frictional engagement with successive downstream arrays of ending rolls of said downstream array.

6. The apparatus of claim 1 wherein said at least one running element includes a pair of running elements disposed oppositely on upper and lower sides of said workpiece flow path, said pair of running elements vertically spaced apart for pinching the workpiece between said pair of running elements.

7. The apparatus of claim 6 wherein said pair of running elements are a pair of rollers.

8. The apparatus of claim 6 wherein said pair of running elements includes at least one hold-down roll on said upper side of said flow path and at least one ending roll on said lower side of said flow path, said at least one hold-down roll for urging the workpiece down onto said at least one ending roll.

9. The apparatus of claim 8 wherein said at least one ending roll is first array of ending rolls extending in said second direction across said flow path.

10. The apparatus of claim 8 wherein said at least one ending roll includes a plurality of ending rolls spaced apart in a first downstream array from a first upstream ending roll, each ending roll of said plurality of ending rolls independently actuable for increasingly accurate repositioning of the workpiece as the workpiece is translated downstream into sequential frictional engagement with successive downstream ending rolls of said plurality of ending rolls, and wherein said at least one hold-down roll includes a plurality of hold-down rolls spaced apart in a second downstream array corresponding to said first downstream array.

11. The apparatus of claim 6 further comprising a frame having upper and lower arms for extending across said flow path and wherein said pair of running elements are a pair of upper and lower arrays of wheels oriented in said first direction, said arrays of wheels mounted respectively to said upper and lower arms of said frame, said actuator selectively translating said frame in said second direction so as to actuate said pair of running elements in said second direction whereby the workpiece is pushed or pulled in said second direction by said pair of running elements.

12. The apparatus of claim 11 wherein said frame is a "C"-shaped frame and said upper and lower arms extend in said second direction respectively above and below said flow path, a vertical arm joining said upper arm to said lower arm adjacent a side edge of said conveyor.

13. The apparatus of claim 6 further comprising a frame having upper and lower arms for extending across said flow path and wherein said pair of running elements are a pair of upper and lower endless belts oriented in said first direction, said endless belts mounted respectively to said upper and lower arms of said frame, said actuator selectively translating said frame in said second direction so as to actuate said pair of running elements in said second direction whereby the workpiece is pushed or pulled in said second direction by said pair of running elements.

14. The apparatus of claim 6 further comprising a frame having upper and lower arms for extending across said flow path and wherein said pair of running elements are a pair of upper and lower endless chains oriented in said first direction, said endless chains mounted respectively to said upper and lower arms of said frame, said actuator selectively translating said frame in said second direction so as to actuate said pair of running elements in said second direction whereby the workpiece is pushed or pulled in said second direction by said pair of running elements.

15. The apparatus of claim 6 wherein said pair of running elements includes a plurality of said pairs of running elements spaced apart in a downstream array from a first upstream pair of running elements, each said pair of running elements of said downstream array independently actuable in said second direction for increasingly accurate repositioning of the workpiece as the workpiece is translated downstream into sequential frictional engagement with successive downstream pairs of running elements of said downstream array.

16. The apparatus of claim 11 wherein said pair of upper and lower arrays of wheels includes a plurality of said pairs of upper and lower arrays of wheels spaced apart in a downstream array from a first upstream pair of upper and lower arrays of wheels, each said pair of upper and lower arrays of wheels of said downstream array independently actuable in said second direction for increasingly accurate repositioning of the workpiece as the workpiece is translated downstream into sequential frictional engagement with successive downstream pairs of upper and lower arrays of wheels of said downstream array.

17. The apparatus of claim 13 wherein said pair of upper and lower endless belts includes a plurality of said pairs of upper and lower endless belts spaced apart in a downstream array from a first upstream pair of upper and lower endless belts, each said pair of upper and lower endless belts of said downstream array independently actuable in said second direction for increasingly accurate repositioning of the workpiece as the workpiece is translated downstream into sequential frictional engagement with successive downstream pairs of upper and lower endless belts of said downstream array.

18. The apparatus of claim 14 wherein said pair of upper and lower endless chains includes a plurality of said pairs of upper and lower endless chains spaced apart in a downstream array from a first upstream pair of upper and lower endless chains, each said pair of upper and lower endless chains of said downstream array independently actuable in said second direction for increasingly accurate repositioning of the workpiece as the workpiece is translated downstream into sequential frictional engagement with successive downstream pairs of upper and lower endless chains of said downstream array.

19. An apparatus for repositioning a workpiece comprising:

a lugged conveyor having lugs for carrying the workpiece spaced apart by a lug space in a downstream direction, a sensor for detecting the position of the workpiece on the conveyor and relaying position information to a processor, at least one running element mounted in cooperation with said conveyor so as to be disposed on one side of a workpiece flow path on said conveyor, said at least one running element for frictionally engaging a workpiece with said at least one running element as the workpiece translates downstream in a first direction along the flow path on said conveyor, wherein, on said conveyor, the workpiece is oriented so that its longitudinal axis is substantially perpendicular to said first direction, and wherein said at least one running element does not move relative to said first direction and wherein said at least one running element is selectively actuable so as to selectively translate the workpiece when in said frictional engagement therewith, in a second direction substantially perpendicular to said first direction, a selectively actuable actuator cooperating with said processor for said selective actuation of said at least one running element in said second direction so as to urge the workpiece in lateral translation across the flow path and perpendicular to said first direction according to repositioning instructions from said processor in response to said position information from said sensor as the workpiece simultaneously translates in said first direction downstream along said flow path across said at least one running element while frictionally engaged by said running element, wherein said at least one running element has a length in said first direction which does not exceed the length of said lug space of said lugs on said lugged conveyor.

20. The apparatus of claim 19 wherein said at least one running element is at least one ending roll.

21. The apparatus of claim 20 wherein said at least one ending roll is a first array of ending rolls extending in said second direction across said flow path.

22. The apparatus of claim 20 wherein said at least one ending roll includes a plurality of ending rolls spaced apart in a downstream array from a first upstream ending roll, each ending roll of said plurality of ending rolls independently actuable for increasingly accurate repositioning of the workpiece as the workpiece is translated downstream into sequential frictional engagement with successive downstream ending rolls of said plurality of ending rolls.

23. The apparatus of claim 20 wherein said at least one ending roll includes a plurality of arrays of ending rolls wherein each array of ending rolls in said plurality of arrays of ending rolls is an array of ending rolls extending in said second direction across said flow path, and wherein said plurality of arrays of ending rolls are spaced apart in a downstream array from a first upstream array of ending rolls, each said array of ending rolls of said downstream array independently actuable for increasingly accurate repositioning of the workpiece as the workpiece is translated downstream into sequential frictional engagement with successive downstream arrays of ending rolls of said downstream array.

24. The apparatus of claim 19 wherein said at least one running element includes a pair of running elements disposed oppositely on upper and lower sides of said workpiece flow path, said pair of running elements vertically spaced apart for pinching the workpiece between said pair of running elements.

25. The apparatus of claim 24 wherein said pair of running elements are a pair of rollers.

26. The apparatus of claim 24 wherein said pair of running elements includes at least one hold-down roll on said upper side of said flow path and at least one ending roll on said lower side of said flow path, said at least one hold-down roll for urging the workpiece down onto said at least one ending roll.

27. The apparatus of claim 26 wherein said at least one ending roll is first array of ending rolls extending in said second direction across said flow path.

28. The apparatus of claim 26 wherein said at least one ending roll includes a plurality of ending rolls spaced apart in a first downstream array from a first upstream ending roll, each ending roll of said plurality of ending rolls independently actuable for increasingly accurate repositioning of the workpiece as the workpiece is translated downstream into sequential frictional engagement with successive downstream ending rolls of said plurality of ending rolls, and wherein said at least one hold-down roll includes a plurality of hold-down rolls spaced apart in a second downstream array corresponding to said first downstream array.

29. The apparatus of claim 24 further comprising a frame having upper and lower arms for extending across said flow path and wherein said pair of running elements are a pair of upper and lower arrays of wheels oriented in said first direction, said arrays of wheels mounted respectively to said upper and lower arms of said frame, said actuator selectively translating said frame in said second direction so as to actuate said pair of running elements in said second direction whereby the workpiece is pushed or pulled in said second direction by said pair of running elements.

30. The apparatus of claim 29 wherein said frame is a "C"-shaped frame and said upper and lower arms extend in said second direction respectively above and below said flow path, a vertical arm joining said upper arm to said lower arm adjacent a side edge of said conveyor.

31. The apparatus of claim 24 further comprising a frame having upper and lower arms for extending across said flow path and wherein said pair of running elements are a pair of upper and lower endless belts oriented in said first direction, said endless belts mounted respectively to said upper and lower arms of said frame, said actuator selectively translating said frame in said second direction so as to actuate said pair of running elements in said second direction whereby the workpiece is pushed or pulled in said second direction by said pair of running elements.

32. The apparatus of claim 24 further comprising a frame having upper and lower arms for extending across said flow path and wherein said pair of running elements are a pair of upper and lower endless chains oriented in said first direction, said endless chains mounted respectively to said upper and lower arms of said frame, said actuator selectively translating said frame in said second direction so as to actuate said pair of running elements in said second direction whereby the workpiece is pushed or pulled in said second direction by said pair of running elements.

33. The apparatus of claim 24 wherein said pair of running elements includes a plurality of said pairs of running elements spaced apart in a downstream array from a first upstream pair of running elements, each said pair of running elements of said downstream array independently actuable in said second direction for increasingly accurate repositioning of the workpiece as the workpiece is translated downstream into sequential frictional engagement with successive downstream pairs of running elements of said downstream array.

34. The apparatus of claim 29 wherein said pair of upper and lower arrays of wheels includes a plurality of said pairs of upper and lower arrays of wheels spaced apart in a downstream array from a first upstream pair of upper and lower arrays of wheels, each said pair of upper and lower arrays of wheels of said downstream array independently actuable in said second direction for increasingly accurate repositioning of the workpiece as the workpiece is translated downstream into sequential frictional engagement with successive downstream pairs of upper and lower arrays of wheels of said downstream array.

35. The apparatus of claim 31 wherein said pair of upper and lower endless belts includes a plurality of said pairs of upper and lower endless belts spaced apart in a downstream array from a first upstream pair of upper and lower endless belts, each said pair of upper and lower endless belts of said downstream array independently actuable in said second direction for increasingly accurate repositioning of the workpiece as the workpiece is translated downstream into sequential frictional engagement with successive downstream pairs of upper and lower endless belts of said downstream array.

36. The apparatus of claim 32 wherein said pair of upper and lower endless chains includes a plurality of said pairs of upper and lower endless chains spaced apart in a downstream array from a first upstream pair of upper and lower endless chains, each said pair of upper and lower endless chains of said downstream array independently actuable in said second direction for increasingly accurate repositioning of the workpiece as the workpiece is translated downstream into sequential frictional engagement with successive downstream pairs of upper and lower endless chains of said downstream array.

* * * * *